Patented July 7, 1936

2,046,884

UNITED STATES PATENT OFFICE 2,046,884

PREPARATION OF AROMATIC DITHIO-CARBAMATES

Waldo L. Semon, Silver Lake Village, Ohio, assignor to The B. F. Goodrich Company, New York, N. Y., a corporation of New York No Drawing. Application August 10, 1935, Serial No. 35,629

19 Claims. (Cl. 260—109)

This invention relates to dithiocarbamic acids and their salts and has as its object the preparation of N-diaryl substituted dithiocarbamic compounds.

Dithiocarbamates have heretofore been made by reacting aliphatic primary or secondary amines with carbon disulphide, which readily forms the amine salt of the N substituted dithiocarbamic acid corresponding to the amine. Even mono-aryl amines such as aniline or methyl aniline undergo this reaction without difficulty. However, diarylamines such as diphenylamine, phenyl naphthylamine and the like will not react with carbon disulphide, hence previous attempts to prepare N-diaryl substituted dithiocarbamic acids and their various derivatives have generally failed and these compounds have remained in the realm of the unknown or of mere laboratory curiosities.

I have discovered that the compounds of diarylamines with metals will react with carbon disulphide to form salts of diaryl dithiocarbamic acids in accordance with the equation:

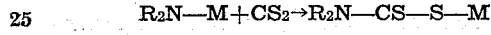

$$R_2N\text{---}M + CS_2 \rightarrow R_2N\text{---}CS\text{---}S\text{---}M$$

where R represents an aryl group and M represents a metal atom. Of course, the bivalent metals are capable of reacting with two molecules of the amine and form salts with two molecules of the dithiocarbamic acid, hence M in the equation may be regarded as a half atom if a bivalent metal is employed.

The process of this invention finds its chief usefulness in reactions involving the highly reactive metals having a positive electrode potential (relative to hydrogen) greater than two volts, not because the compounds of diarylamines with other metals will not undergo the desired reaction, but simply because such compounds of the less reactive metals are rather difficult to prepare. This preferred group of metals having an electrode potential greater than two embraces the alkali and alkaline earth metals (including magnesium). The alkali metals are most reactive and because of its availability at low cost sodium is usually employed.

The diarylamines used in this reaction may be either simple unsubstituted diarylamines such as diphenylamine, phenyl tolyl amine, phenyl cumyl amine, phenyl xenylamine, phenyl naphthylamine, phenyl anthracylamine, ditolylamine, dixenylamine, dinaphthylamine, phenyl ar-tetrahydro-naphthylamine, di(ar-tetrahydro-naphthyl) amine, or amines containing substituents such as halogen, nitro, alkoxy, aryloxy, or secondary or tertiary amino groups, or even heterocyclic amines in which a secondary amino nitrogen is attached to two aromatic rings such as carbazole, o-imino dibenzyl, meso meso dimethyl acridane, thiodiphenylamine, etc. If substituted amines are employed the substituents and the conditions of the reaction should be so chosen as not to interfere with the reaction. For example, care should be taken not to reduce nitro groups in the preparation of the metal compound from nitro-substituted amines, by preparing the metal compound from the metal amide instead of from the free metal. Additional secondary amino groups will generally participate in the reaction, giving compounds containing two or more dithiocarbamic groups. It is to be understood that the term "diarylamine", unless otherwise limited, is herein employed in a generic sense to embrace all the diarylamines and their derivatives and equivalents enumerated above.

The metal compounds of these diarylamines can be prepared by any one of several processes. The diarylamines may for instance be reacted directly with the metal, either with or without the addition of a catalyst, the metal replacing the hydrogen of the amino group. This is usually the simplest method, but in some cases the nascent hydrogen causes difficulty by reducing part or all of the amine to form unwanted by-products. The alkali metals react most readily, especially potassium. Sodium reacts appreciably only at elevated temperatures, although the reaction may be quickened by the addition of a catalyst such as an iron, copper or cobalt salt, iodine, etc. The alkaline earth metals and magnesium will also generally require heating to a fairly high temperature. Another method is to react the amine with the amide or nitride of the metal. This reaction takes place generally at a lower temperature than the direct reaction with the metal, and ammonia is eliminated instead of hydrogen, hence no reduction of the amine can take place.

The metal compound of the diarylamine, however formed, is placed in contact with carbon disulphide which reacts readily at temperatures in the neighborhood of room temperature to form the desired metal salt of the diarylamine. It is generally most convenient to carry out the reaction at the boiling temperature of carbon disulphide and to employ an excess of carbon disulphide to assure a complete reaction of the metal compound of the diarylamine, for these metal compounds are highly reactive and may ignite spontaneously if exposed to the air. It is also preferred to employ a suitable solvent, since the metal compounds of the diarylamines are insoluble in carbon disulphide (as are the dithiocarbamates) and do not react completely if added as coarse fragments. The reaction goes substantially to completion if the metal compounds are finely divided, but grinding them presents difficulties because of their tendency to ignite spontaneously, hence dilution with such solvents as aromatic hydrocarbons or an excess of amine is an easier way to assure contact of the metal compounds with the carbon disulphide. The metal salts of the diaryl dithiocarbamic acids formed are moderately stable compounds which are easily purified by the usual methods such as crystallization from suitable solvents. The alkali metal salts are water soluble and can be crystallized from water as hydrated salts, or from alcohol as anhydrous salts.

As a specific example of one embodiment of the invention the sodium salt of diphenyl dithiocarbamic acid is prepared as follows: 51 pounds of diphenylamine are charged into an iron kettle fitted with an agitator and an efficient reflux condenser and vented through an oil seal, 3.45 pounds of metallic sodium are added and the contents are heated gradually with agitation to the boiling point of the diphenylamine. The iron kettle furnishes traces of iron which catalyses the replacement of hydrogen by the sodium. The reaction commences and hydrogen is eliminated slowly at 230° C. At 280° the reaction is quite vigorous. Finally when the evolution of hydrogen ceases the temperature is raised until diphenylamine starts to reflux. The heating is stopped and after a temperature of 260° to 280° is reached 6 gallons of benzene are added. The benzene refluxes vigorously and rapidly transfers heat to the condenser, cooling the charge quickly to about 90°. At this stage the kettle contains the sodium compound of diphenylamine partly dissolved and partly finely dispersed in a mixture of about 50% excess unreacted diphenylamine and a considerable quantity of benzene. 1½ gallons of carbon disulphide (about 35% excess) is added and reacts vigorously forming the sodium salt of diphenyl dithiocarbamic acid, which is insoluble in benzene and diphenylamine and precipitates. Thereupon 24 gallons of hot water are added, the mixture is reheated to its boiling point and agitation stopped. The salt of the dithiocarbamic acid dissolves in the water which separates as a lower layer in the kettle and is withdrawn. The upper layer is then heated to distil off the excess carbon disulphide and the benzene, leaving in the kettle the excess diphenylamine, which can be used in preparing the next batch. The aqueous layer is mixed with 1 gallon of 46% caustic soda, which somewhat diminishes the solubility of the salt in the water, and is cooled, whereupon the sodium salt of diphenyl dithiocarbamic acid crystallizes out in almost quantitative yield.

The magnesium salt of diphenyl dithiocarbamic acid may be similarly prepared by refluxing an excess of diphenylamine containing a trace of iodine with metallic magnesium until all the metal has reacted, cooling, preferably with the addition of benzene or other inert solvent, and adding carbon disulphide. The magnesium salt of diphenyl dithiocarbamic acid thus formed is extracted with hot water and crystallized out by cooling the solution.

The sodium salt of phenyl beta-naphthyl dithiocarbamic acid is prepared by dissolving a slight excess over 1 molar quantity of phenyl beta-naphthylamine in ether, adding 1 mol. of powdered sodamide under a reflux condenser, whereupon ammonia gas is eliminated and the sodium compound of phenyl beta-naphthlamine precipitates in a finely divided condition. An excess of carbon disulphide is added after the first reaction is complete, and the liquid is refluxed for a short time. The precipitate is thereby converted to the sodium salt of phenyl beta-naphthyl dithiocarbamic acid, which may be filtered off and dried.

If salts of other dithiocarbamic acids are desired, other diarylamines will be substituted with such obvious changes in proportions and procedure as will suggest themselves to the chemist.

If salts of other metals are desired they may be prepared by substituting the corresponding metal (if an alkali or alkaline earth metal) for the sodium or magnesium, or from the sodium salt by double decomposition. For instance the zinc salt may be prepared by adding a zinc chloride solution to an aqueous solution of the sodium salt, the lead salt by adding lead acetate, etc., these salts precipitating since they are insoluble in water. Other derivatives are equally readily produced by well known reactions; esters and mixed acid anhydrides by reacting the sodium salt with appropriate halides of the hydrocarbons or acids, thiuram disulphides by oxidation, thiuram polysulphides by reaction with sulphur chloride, etc. If desired, the free diaryl dithiocarbamic acids may be isolated by acidifying their salts, since they, unlike previously known dithiocarbamic acids, are comparatively stable.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied, and other materials having equivalent properties may be employed if desired without departing from the spirit and scope of the invention as defined in the appended claims.

I claim:

1. The method of forming an N-diaryl dithiocarbamate which comprises reacting carbon disulphide with the compound of a diarylamine and a metal, in which the metal is directly attached to the amino nitrogen.

2. The method of forming an N-diaryl dithiocarbamate which comprises reacting carbon disulphide with the compound of a diarylamine and a metal having an electrode potential greater than two, in which the metal is directly attached to the amino nitrogen.

3. The method of forming an N-diaryl dithiocarbamate which comprises reacting carbon disulphide with the compound of a diarylamine and an alkyl metal, in which the metal is directly attached to the amino nitrogen.

4. The method of forming an N-diaryl dithiocarbamate which comprises reaction carbon disulphide and the sodium compound of a diarylamine, in which the sodium is directly attached to the amino nitrogen.

5. The method of forming an N-diaryl dithiocarbamate which comprises reacting carbon disulphide with the compound of a di (aryl hydrocarbon) amine and a metal having an electrode potential greater than two.

6. The method of forming an N-diaryl dithiocarbamate which comprises reacting carbon disulphide with the compound of a di (aryl hydrocarbon) amine and sodium.

7. The method of forming an N-diphenyl dithiocarbamate which comprises reacting carbon disulphide with the compound of diphenylamine and a metal having an electrode potential greater than two.

8. The method of forming sodium diphenyl dithiocarbamate which comprises reacting carbon disulphide with the sodium compound of diphenylamine.

9. The method of forming magnesium diphenyl dithiocarbamate which comprises reacting carbon disulphide with the magnesium compound of diphenylamine.

10. The method of forming a phenyl naphthyl dithiocarbamate which comprises reacting carbon disulphide with the compound of phenyl naphthylamine and a metal having an electrode potential greater than two.

11. The method of forming sodium phenyl beta-naphthyl dithiocarbamate which comprises reacting carbon disulphide with the sodium compound of phenyl beta-naphthylamine.

12. The method of forming an N-diaryl dithiocarbamate which comprises reacting a diarylamine with a metal having an electrode potential greater than two to form a compound in which the metal is directly attached to the amino nitrogen of the diarylamine and reacting further with carbon disulphide.

13. The method of forming sodium diphenyl dithiocarbamate which comprises heating diphenylamine with sodium to form the sodium compound of diphenylamine and reacting further with carbon disulphide.

14. The method of forming an N-diaryl dithiocarbamate which comprises reacting carbon disulphide with a suspension, in an inert organic liquid, of the compound of a diarylamine and a metal having an electrode potential greater than two in which the metal is directly attached to the amino nitrogen.

15. The method of forming an N-diaryl dithiocarbamate which comprises reacting carbon disulphide with a suspension, in an inert organic liquid, of the sodium compound of a diarylamine in which the sodium is directly attached to the amino nitrogen.

16. The method of forming an N-diaryl dithiocarbamate which comprises reacting carbon disulphide with a suspension, in an inert organic liquid, of the compound of a diarylamine and a metal having an electrode potential greater than two in which the metal is directly attached to the amino nitrogen, and extracting the dithiocarbamate with water.

17. The method of forming an N-diaryl dithiocarbamate which comprises reacting carbon disulphide with a suspension, in an inert organic liquid, of the sodium compound of a diarylamine in which the sodium is directly attached to the amino nitrogen, and extracting the dithiocarbamate with water.

18. The method of forming sodium diphenyl dithiocarbamate which comprises reacting carbon disulphide with a suspension of the sodium compound of diphenylamine in an inert organic liquid, and extracting the dithiocarbamate with water.

19. The method of forming sodium diphenyl dithiocarbamate which comprises heating diphenylamine with sodium to form the sodium compound of diphenylamine, suspending this compound in an inert organic liquid, reacting it with carbon disulphide, and extracting the dithiocarbamate with water.

WALDO L. SEMON.

CERTIFICATE OF CORRECTION.

Patent No. 2,046,884.  July 7, 1936.

WALDO L. SEMON.

It is hereby certified that error appears in the printed specification of the above numbered patent requiring correction as follows: Page 2, second column, line 62, claim 4, for the word "reaction" read reacting; and that the said Letters Patent should be read with this correction therein that the same may conform to the record of the case in the Patent Office.

Signed and sealed this 19th day of October, A. D. 1937.

(Seal)

Henry Van Arsdale.
Acting Commissioner of Patents.